(12) United States Patent
Buchanan et al.

(10) Patent No.: US 9,586,634 B2
(45) Date of Patent: Mar. 7, 2017

(54) TRACK DRIVE

(71) Applicant: MTD Products Inc, Valley City, OH (US)

(72) Inventors: Peter J. Buchanan, Elyria, OH (US); Jimmy N. Eavenson, Sr., Auroa, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 14/724,172

(22) Filed: May 28, 2015

(65) Prior Publication Data

US 2016/0052569 A1 Feb. 25, 2016

Related U.S. Application Data

(60) Provisional application No. 62/039,940, filed on Aug. 21, 2014.

(51) Int. Cl.
| | |
|---|---|
| *B62D 55/08* | (2006.01) |
| *B62D 55/14* | (2006.01) |
| *B62D 55/24* | (2006.01) |
| *B62D 55/02* | (2006.01) |
| *B62D 55/04* | (2006.01) |
| *B62D 55/10* | (2006.01) |
| *B62D 55/135* | (2006.01) |

(52) U.S. Cl.
CPC .............. *B62D 55/08* (2013.01); *B62D 55/02* (2013.01); *B62D 55/04* (2013.01); *B62D 55/10* (2013.01); *B62D 55/135* (2013.01); *B62D 55/14* (2013.01); *B62D 55/24* (2013.01)

(58) Field of Classification Search
None
See application file for complete search history.

(56) References Cited

U.S. PATENT DOCUMENTS

| | | |
|---|---|---|
| 4,618,015 A | 10/1986 | Yochum |
| 4,683,970 A | 8/1987 | Smith |
| 4,706,769 A | 11/1987 | Latourelle et al. |
| 5,273,126 A | 12/1993 | Reed et al. |
| 5,318,141 A | 6/1994 | Hansen |
| 5,393,134 A | 2/1995 | Oertley |

(Continued)

OTHER PUBLICATIONS

International Search Report and Written Opinion mailed Nov. 5, 2015 for PCT/US2015/046266 filed Aug. 21, 2015.

*Primary Examiner* — J. Allen Shriver, II
*Assistant Examiner* — Hilary L Johns
(74) *Attorney, Agent, or Firm* — Wegman, Hessler & Vanderburg

(57) ABSTRACT

Provided is a track drive for outdoor power equipment including a support frame and a drive axle configured to attach to an associated drive hub. A hub bearing is mounted on the drive axle and the support frame enabling the drive axle to rotate relative to the support frame. A drive sprocket is attached to the drive axle and includes an interior half sprocket and an exterior half sprocket. The half sprockets are located on either side of the support frame. Drive teeth are spaced radially about the drive sprocket. The drive sprocket is movably engaged with an endless track to transmit force to rotate the endless track and propel the outdoor power equipment. A kit for adding or replacing a track drive of outdoor power equipment is also provided.

14 Claims, 10 Drawing Sheets

(56) References Cited

U.S. PATENT DOCUMENTS

| | | | |
|---|---|---|---|
| 6,006,847 A * | 12/1999 | Knight | B62D 55/04 180/9.25 |
| 6,123,399 A | 9/2000 | Snyder | |
| 6,595,603 B2 | 7/2003 | Rutz et al. | |
| 6,615,939 B1 | 9/2003 | Karales et al. | |
| 6,733,093 B2 | 5/2004 | Deland et al. | |
| 7,328,760 B2 | 2/2008 | Inaoka et al. | |
| 7,416,266 B2 | 8/2008 | Soucy et al. | |
| 7,478,688 B2 | 1/2009 | Ki | |
| 7,673,711 B1 | 3/2010 | Berg | |
| 8,104,846 B2 | 1/2012 | Porubcansky et al. | |
| 8,152,248 B2 | 4/2012 | Brazier | |
| 2005/0035655 A1* | 2/2005 | Beckstrom | B62D 55/112 305/173 |
| 2010/0139994 A1* | 6/2010 | Hansen | B62D 55/04 180/9.26 |
| 2012/0242142 A1* | 9/2012 | Kautsch | B62D 55/02 305/142 |
| 2014/0175865 A1* | 6/2014 | Korus | B62D 55/04 305/180 |

* cited by examiner

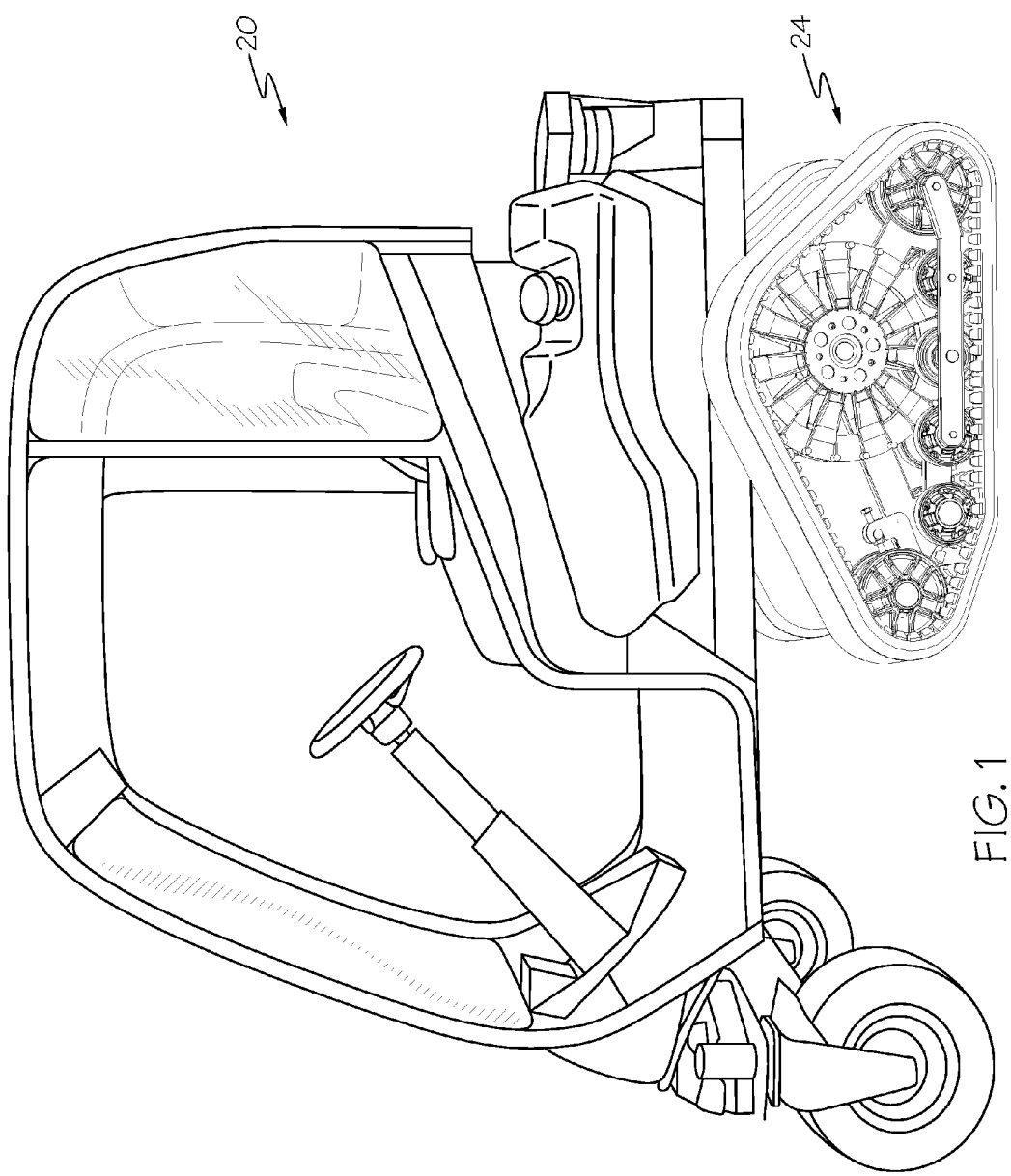

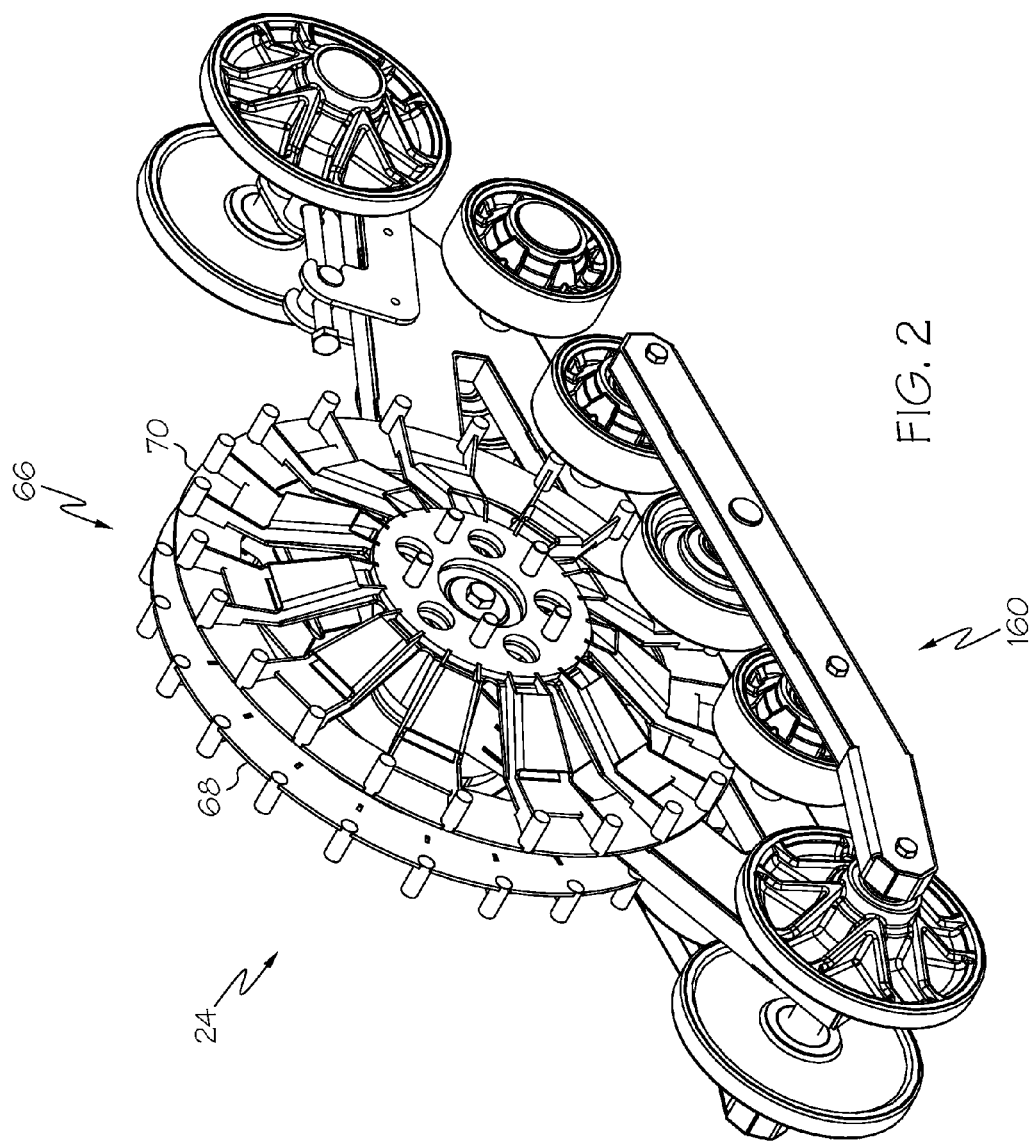

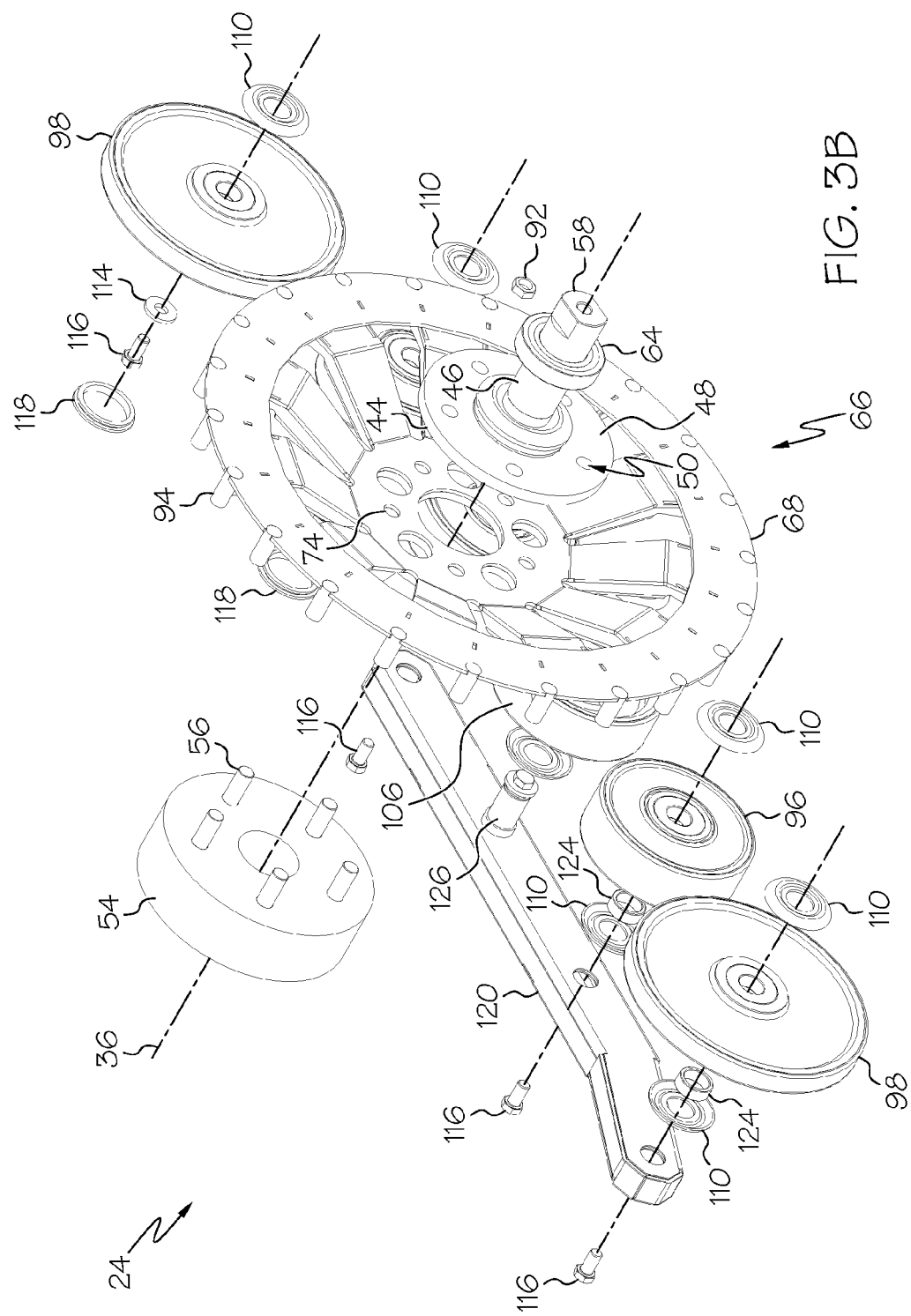

TRACK DRIVE

This application claims the benefit of U.S. Provisional Application No. 62/039,940, filed Aug. 21, 2014, the entire disclosure of which is hereby incorporated herein by reference.

BACKGROUND

1. Field of the Disclosure

This application relates generally to outdoor power equipment, and more specifically to outdoor power equipment including track drives.

2. Description of Related Art

Currently available track drives for power equipment are generally provided with mechanisms including sprockets having removable sectors which aid in installation and removal of endless tracks, or have sprockets that are unitary pieces that are difficult to install and remove. These offerings can limit performance due to lateral derailment of tracks, drive lug skipping, and backlash impacts during load and direction reversals.

Other replacement track drive options designed to convert "wheeled" configurations to tracked configurations include limitations that affect performance, such as lower travel speed, higher centers of gravity, higher loading and/or stress on the outdoor power equipment's traction drive system, and a harsh ride. Accordingly, improvements to electric lawn maintenance vehicles are desired.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a track drive for outdoor power equipment including a support frame. The track drive also includes a drive axle configured to attach to an associated drive hub on said outdoor power equipment. The track drive further includes a hub bearing mounted on the drive axle and the support frame. The hub bearing enables the drive axle to rotate relative to the support frame. The track drive still further includes a drive sprocket attached to the drive axle. The drive sprocket includes an interior half sprocket and an exterior half sprocket. The half sprockets are located on either side of the support frame. The drive sprocket includes drive teeth spaced radially about the drive sprocket. The track drive also includes an endless track. The drive sprocket is movably engaged with the endless track to transmit force to rotate the endless track and propel the outdoor power equipment.

According to another aspect, the subject application involves an outdoor power equipment unit including a track drive. The track drive includes a support frame. The track drive also includes a drive axle configured to attach to an associated drive hub on the outdoor power equipment. The track drive further includes a hub bearing mounted on the drive axle and the support frame. The hub bearing enables the drive axle to rotate relative to the support frame. The track drive still further includes a drive sprocket attached to the drive axle. The drive sprocket includes an interior half sprocket and an exterior half sprocket. The half sprockets are located on either side of the support frame. The drive sprocket includes drive teeth spaced radially about the drive sprocket. The drive track also includes an endless track. The drive sprocket is movably engaged with the endless track to transmit force to rotate the endless track and propel the outdoor power equipment.

According to another aspect, the subject application involves a kit for adding or replacing a track drive of outdoor power equipment including a) a track drive. The track drive includes a support frame. The track drive also includes a drive axle configured to attach to an associated drive hub on the outdoor power equipment. The track drive further includes a hub bearing mounted on the drive axle and the support frame. The hub bearing enables the drive axle to rotate relative to the support frame. The track drive still further includes a drive sprocket attached to the drive axle. The drive sprocket includes an interior half sprocket and an exterior half sprocket. The half sprockets are located on either side of the support frame. The drive sprocket includes drive teeth spaced radially about the drive sprocket. The drive track also includes an endless track. The drive sprocket is movably engaged with the endless track to transmit force to rotate the endless track and propel the outdoor power equipment. The kit also includes b) a plurality of hardware fasteners.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIG. 1 is a perspective view of an example outdoor power equipment with a track drive in accordance with aspects of the present disclosure;

FIG. 2 is a perspective view of the track drive assembly of the outdoor power equipment of FIG. 1 with an endless track removed for clarity;

FIG. 3B is an exploded view of a portion of the track drive assembly of FIG. 2;

DETAILED DESCRIPTION

Figure 3A:
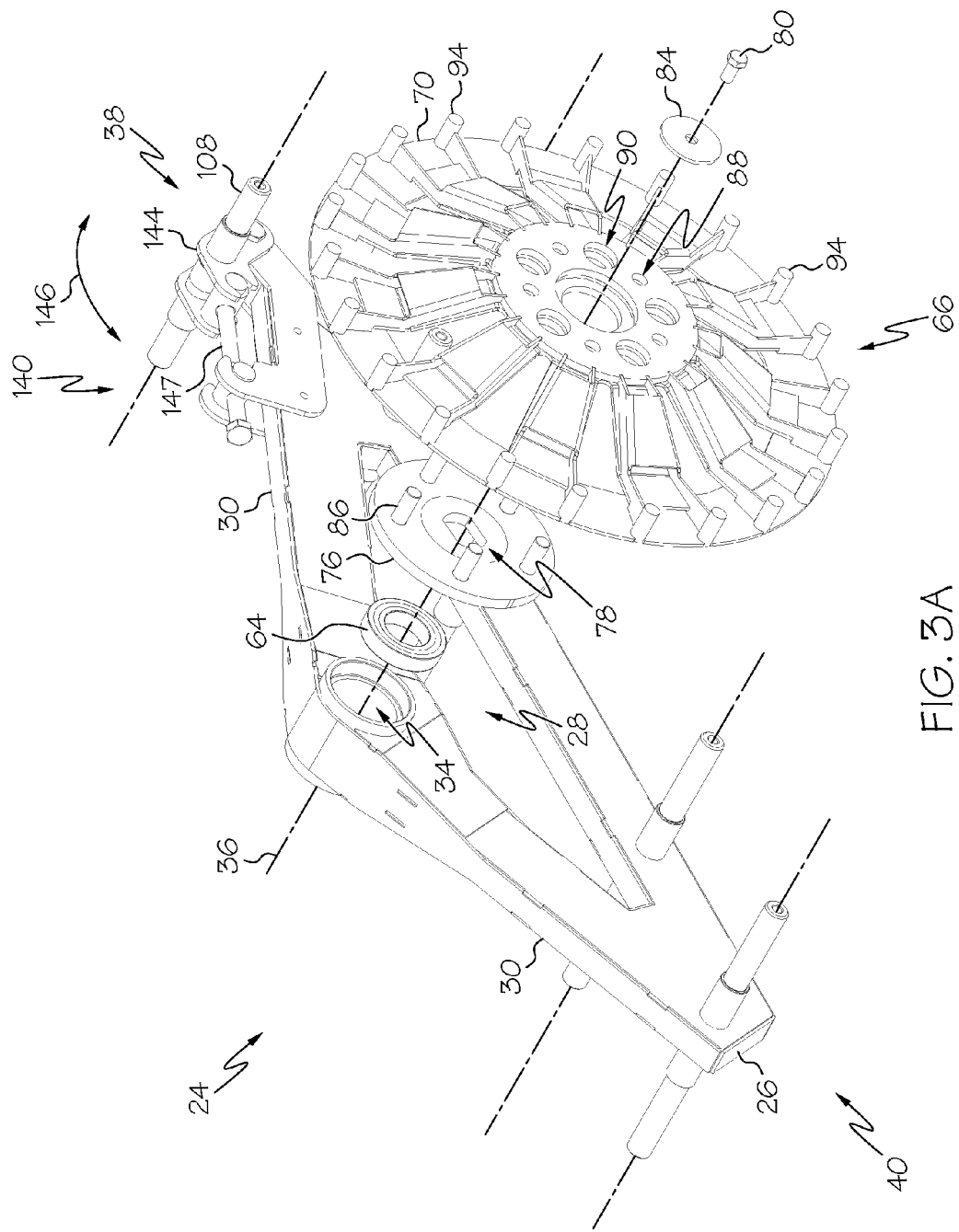
FIG. 3A is an exploded view of a portion of the track drive assembly of FIG. 2.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

FIG. 1 shows a perspective view of a piece of power outdoor equipment 20 including a track drive 24 according to at least one aspect of the present disclosure. For the purposes of this disclosure, the power outdoor equipment unit 20 can include, but is not limited to: garden tractors, all-terrain vehicles (ATV), utility vehicles (UV), farm tractors, lawn maintenance vehicles, etc. However, for the remainder of the disclosure, the power outdoor equipment unit 20 will be shown and discussed in the form of a garden tractor.

FIG. 2 shows an assembled track drive 24. In one example, the track drive 24 can be attached to the power outdoor equipment 20 as original equipment. In another example, the track drive 24 can be a replacement for a drive wheel such as a wheel and associated pneumatic tire.

Figure 3C:
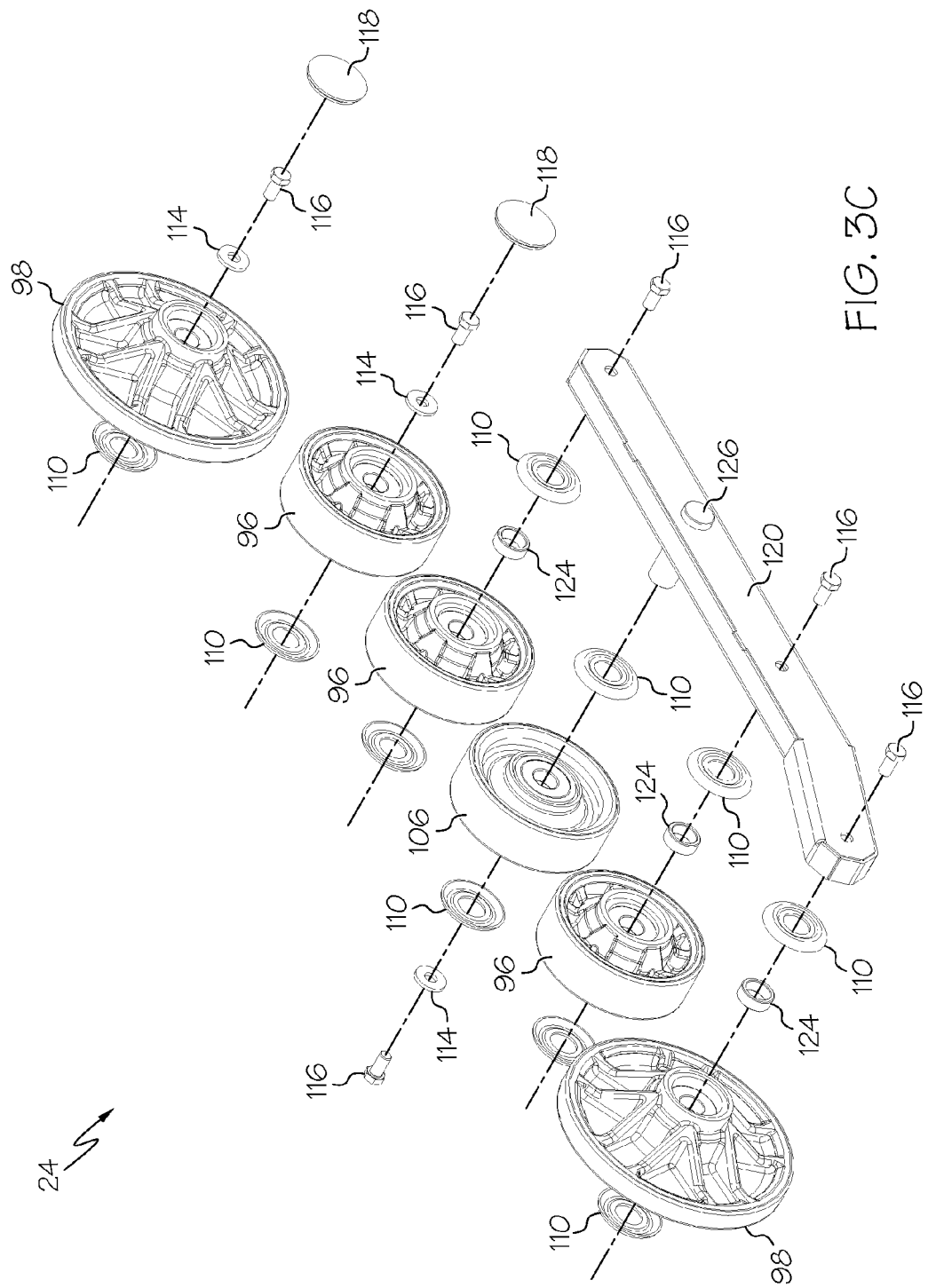
FIG. 3C is an exploded view of a portion of the track drive assembly of FIG. 2.
Figure 4:
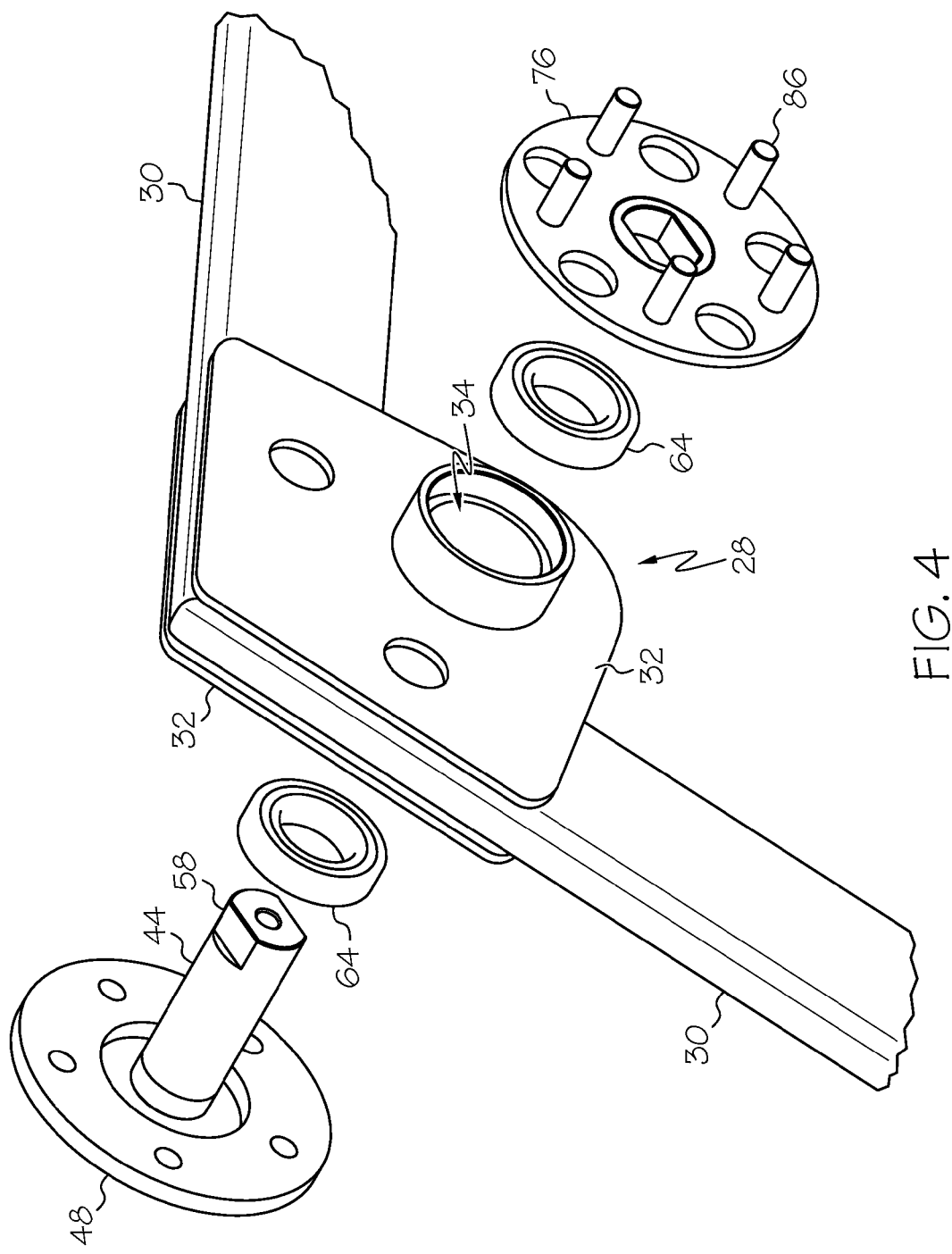
FIG. 4 is a detail perspective view of the upper portion of an example support frame reinforcement of the track drive assembly of FIG. 2.

FIGS. 3A, 3B, and 3C depict portions of an exploded view of the track drive 24. Portions of the track drive 24 have been separated into the three figures for clarity, and each of these figures refers to the track drive portions with the reference numeral 24. As shown in FIG. 3A, the track drive 24 includes a support frame 26. In the shown example, the support frame 26 is substantially triangular including an upper angle 28. While not essential to the disclosure, the support frame 26 can include structure intended to strengthen the support frame 26. For example, as shown in FIG. 3A, the legs 30 of the support frame 26 around the upper angle 28 can be widened. Alternatively, as shown in FIG. 4, the legs 30 of the support frame 26 can include additional bracing 32. These examples are not meant to be limiting, and any suitable support frame construction can be used.

Returning to FIG. 3A, the support frame 26 defines an aperture 34. In one example, the aperture 34 is located substantially on a center line (represented by line 36) of the support frame 26 with respect to a forward end 38 and a rear end 40 of the support frame 26. The aperture 34 can include a pre-selected inside diameter configured to interact with specific components which will be described below.

Turning to FIG. 3B, the track drive 24 further includes a drive axle 44. The drive axle 44 can include several features including a shaft portion 46. The drive axle 44 can also include a hub portion 48. The hub portion 48 can include a generally flat, cylindrical shape at one end of the drive axle 44. The hub portion 48 can define a plurality of apertures 50 configured to attach the drive axle 44 to an associated drive hub 54 located on the outdoor power equipment 20. The drive hub 54 is attached to or integrated into the drive axles of the outdoor power equipment 20. For example, the associated drive hub 54 can be a portion of a disc brake unit of the outdoor power equipment unit 20 that includes a plurality of threaded studs 56. The threaded studs 56 can pass through the apertures 50 of the hub portion 48. In this arrangement, rotational power supplied by the outdoor power equipment unit 20 can be transferred to the drive axle 44. The end of the drive axle 44 opposite the hub portion 48 can include a protrusion 58 that includes a non-circular cross-section. The cross-section can be D-shaped when viewed as a plane transverse to a central axis (represented by line 36) of the drive axle 44. Any suitable cross-section or configuration can be included on the protrusion 58 to help transmit rotational power, including, but not limited to: a spline, a straight shaft with a key, a tapered shaft, etc. The central axis 36 of the drive axle 44 can be coincident with a central axis 36 of other features such as the aperture 34, the associated drive hub 54 and other features which will be described later.

The cross-section of the protrusion 58 can also be double D-shaped such that the curved portions of the peripheral surface provide a circular curved edge in cross section. The flat faces on the periphery provide flat portion on the cross-section. The described D-shaped or double D-shaped cross-section of the protrusion 58 enables transfer of rotational power from the drive axle 44 to components which will be described below while reducing and/or eliminating slippage when the drive axle 44 is mated to another component(s).

The track drive 24 further includes a hub bearing 64 mounted on the drive axle 44 and the support frame 26. The hub bearing 64 can include an outside diameter suitable to be secured within the aperture 34 (best seen in FIG. 3A) to eliminate movement along the central axis 36. The hub bearing 64 can also be secured to the drive axle 44 and such that it eliminates translational movement between the support frame 26 and the drive axle 44 while it enables the drive axle 44 to rotate relative to the support frame 26 about the central axis 36. Any number of hub bearings 64 can be used, for example, one hub bearing 64 is shown in FIG. 3A and one in FIG. 3B for a total of two hub bearings 64. In this arrangement, the drive axle 44 passes through the aperture 34 in the support frame 26.

The track drive 24 includes a drive sprocket 66 attached to the drive axle 44. The drive sprocket 66 includes an interior half sprocket 68 (best seen in FIG. 3B) and an exterior half sprocket 70 (best seen in FIG. 3A). The half sprockets 68, 70 are located on either side of the support frame 26. In this instance, the term "either side" is meant to indicate that the interior half sprocket 68 is located between the support frame 26 and the outdoor power equipment unit 20, while the exterior half sprocket 70 is located on the opposing side of the support frame 26, which can be considered an "outboard" or exterior side.

As shown in FIG. 3B, the interior half sprocket 68 can be attached to the drive axle 44 in any suitable fashion. In the shown example, the interior half sprocket 68 defines apertures 74 configured to correspond with the threaded studs 56 located on the associated drive hub 54. The threaded studs 56 can pass through the apertures 74 in the interior half sprocket 68 and then through the apertures 50 in the hub portion 48 such that the interior half sprocket 68 is sandwiched between the associated drive hub 54 and the hub portion 48. Extension of the threaded studs 56 through the apertures 74 located in the interior half sprocket 68 also enables efficient transfer of rotational power from the associated drive hub 54 to the interior half sprocket 68. In another example, the drive axle 44 and the interior half sprocket 68 can be formed into one unitary piece such that the two cannot be separated.

Returning to FIG. 3B, the exterior half sprocket 70 can be attached to the drive axle 44 in any suitable fashion. In the shown example, the drive axle 44 is attached to an exterior hub 76. The exterior hub 76 can define an aperture 78 having a non-circular cross-section which corresponds to the non-circular cross-section of the protrusion 58 on the drive axle 44. The protrusion 58 on the drive axle 44 can slide into the aperture 78 with relatively close tolerance such that the surfaces of the protrusion 58 and the aperture 78 interact with each other and enable the transfer of rotational power. In one example, the non-circular cross-section of the aperture 78 can be D-shaped or double-D shaped to reduce and/or eliminate slippage when the drive axle 44 is mated to the exterior hub 76. A screw 80 and a washer 84 can fasten the exterior hub 76 to the drive axle 44 by interacting with a threaded hole defined by the drive axle 44, for example, centrally located on an end face of the protrusion 58.

The exterior hub 76 can then be attached to the exterior half sprocket 70. Similar to the associated drive hub 54, the exterior hub 76 can include a plurality of studs 86 arranged radially about the central axis 60. Any number of studs 86 can be used, for example, a five-stud 86 pattern as shown in FIG. 3A or a four-stud 86 pattern as shown in FIG. 4. Returning to FIG. 3A, the studs 86 can pass through a plurality of apertures 88 of the exterior hub 76. In this arrangement, rotational power transmitted through the drive axle 44 is transmitted to the exterior hub 76. In another example, the exterior hub 76 and the exterior half sprocket 70 can be formed into one unitary piece such that the two cannot be separated.

The exterior half sprocket 70 can also define at least one oversize hole 90 enabling a fastener to be applied to the associated drive hub 54 to fasten the track drive 24 to the outdoor power equipment unit 24. For example, a hardware fastener 92 (best seen in FIG. 3B) such as a nut can be passed through the oversize hole 90 in order to place the hardware fastener 92 onto one or more of the threaded studs 56. Application of the hardware fastener 92 secures the drive axle 44 and the interior half sprocket 68 to the associated drive hub 54 in the sandwich configuration previously described. In one example, the oversize hole 90 can accommodate the hardware fastener 92 and an application tool to manipulate the hardware fastener 92. In some examples, the number of oversize holes 90 is equal to the number of threaded studs 56 and are offset radially from the apertures 88. The diameter of the oversize hole 90 can be large enough to pass the hardware fastener 92 and the application tool through while enabling enough of an offset angle of the application tool to properly fasten the hardware fastener 92 at a non-zero angle from a center line of the threaded stud 56.

Figure 5:
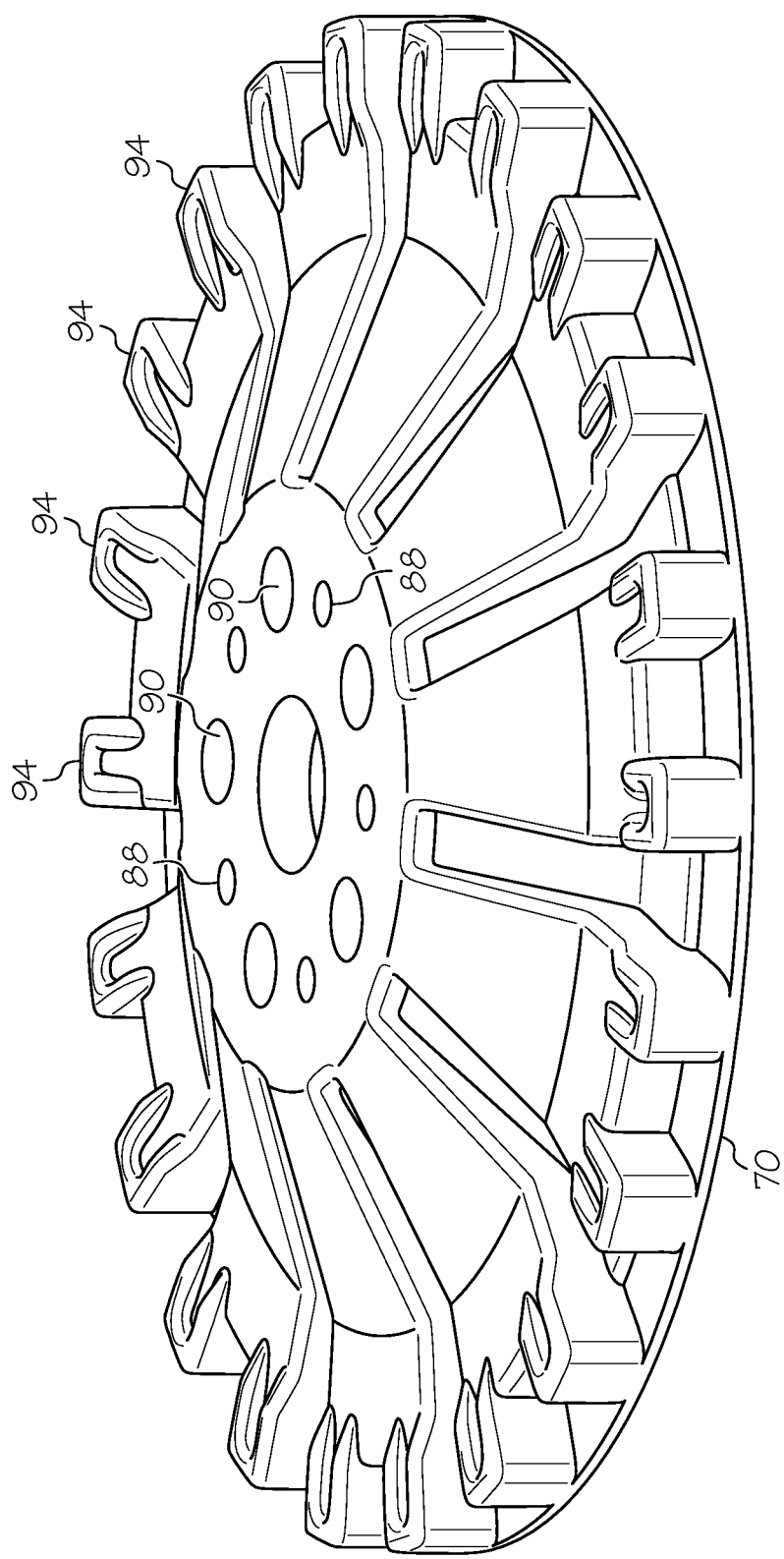
FIG. 5 is an example drive sprocket half to be used in conjunction with the track drive assembly of FIG. 2.

In one example, the interior half sprocket 68 and the exterior half sprocket 70 can be identical. Additionally, the half sprockets 68, 70 can be formed of any suitable material, including, but not limited to steel, aluminum, plastic, or a combination of materials, such as a steel hub with over-molded plastic. Each half sprocket 68, 70 can be disc-shaped and include a generally frusto-conical profile with a generally hollow interior space. Each hollow interior space can be configured to include adequate volume to accommodate portions of the drive axle 44, the hub bearing 64, the exterior hub 76, and any enlarged portion of the support frame 26. Additionally, each half sprocket 68, 70 can include a plurality of drive teeth 94 spaced radially about the half sprocket 68, 70. The drive teeth 94 can be of any suitable fashion to interact with structure on an endless track which will be described below. In one example, as shown in FIGS. 3A and 3B, the drive teeth 94 can be cylindrical appendages from the half sprocket 68, 70 near the outside diameter of the half sprocket 68, 70. In another example, as shown in FIG. 5, each of the drive teeth 94 can be rectangular in shape. Regardless of the shape or form of the drive teeth 94, they are configured to transfer rotational power to another structure.

As shown in FIGS. 3B and 3C, the track drive 24 can further include a plurality of idler wheels 96. Three of the idler wheels 96 can be located on the interior side of the support frame 26 (one visible in FIG. 3B) and three additional idler wheels 96 can be located on the exterior side of the support frame 26 as shown in FIG. 3C. Similarly, the track drive 24 can further include a plurality of bogie wheels. On each of the interior and exterior sides of the track drive 24, a large bogie wheel 98 can be attached to the support frame 26 at the forward end 38. A large bogie wheel 98 can also be attached to the support frame 26 at a rear end 40. A small bogie wheel 106 can be located between the two large bogie wheels 98. Two of the idler wheels 96 can be located between the large bogie wheel 98 located at the forward end 38 and the small bogie wheel 106, while one idler wheel can be located between the large bogie wheel 98 located at the rear end 40 and the small bogie wheel 106. While the figures and the description describe a total of twelve idler wheels 96 and bogie wheels 98, 106, it is to be appreciated that any suitable number of wheels 96, 98, 106 and arrangement of those wheels 96, 98, 106 can be used on the track drive 24. Additionally, the wheels 96, 98, 106 can be constructed of any suitable material including plastic and/or rubber and can include bearings.

Returning to FIG. 3A, the idler wheels 96 and bogie wheels 98, 106 can be attached to the support frame 26 in any suitable fashion. Describing example attachment structures beginning at the forward end 38 of the support frame 26 and moving toward the rear end 40, the large bogie wheel 98 is attached to the support frame 26 on a pin 108. The large bogie wheel 98 can be attached to the pin 108 with a shoulder washer 110, a flat washer 114, a threaded fastener 116, and a cap 118 as shown in FIGS. 3B and 3C. The adjacent idler wheel 96 is also attached to the support frame 26 using the shoulder washer 110, the flat washer 114, the threaded fastener 116, and the cap 118 as shown in FIG. 3C.

As shown in FIGS. 3B and 3C, the track drive 24 can also include an outer support link 120 configured to support the idler wheels 96 and bogie wheels 98, 106. The outer support link 120 can be attached to the support frame 26 through a number of idler wheels 96 and bogie wheels 98, 106. For example, the middle idler wheel 96 can be attached to the support frame 26 on its interior side and the outer support link 120 on its exterior side. Two shoulder washers 110, the threaded fastener 116, and a spacer 124 can be used to attach the middle idler wheel 96. The small bogie wheel 106 is attached to the outer support link 120 only using a pin 126, two shoulder washers 110, the flat washer 114, and the threaded fastener 116. The outer support link 120 is configured to support a bogie wheel (e.g., the small bogie wheel 106) in a cantilever arrangement. One of the purposes of the outer support link 120 is to provide a cantilever attachment location for the small bogie wheel 106 and enable transfer of weight through the small bogie wheel 106, the outer support link 120, the wheels 96, 98, the support frame 26, the drive axle 44, and on to the associated drive hub 54. It is also to be appreciated that in some examples, the small bogie wheel 106 is not supported in a cantilever fashion.

The rearward idler wheel 96 can be attached to the support frame 26 on its interior side and the outer support link 120 on its exterior side using two shoulder washers 110, the threaded fastener 116, and the spacer 124. The rearward large bogie wheel 98 can also be attached to the support frame 26 on its interior side and the outer support link 120 on its exterior side using two shoulder washers 110, the threaded fastener 116, and the spacer 124.

Figure 6:
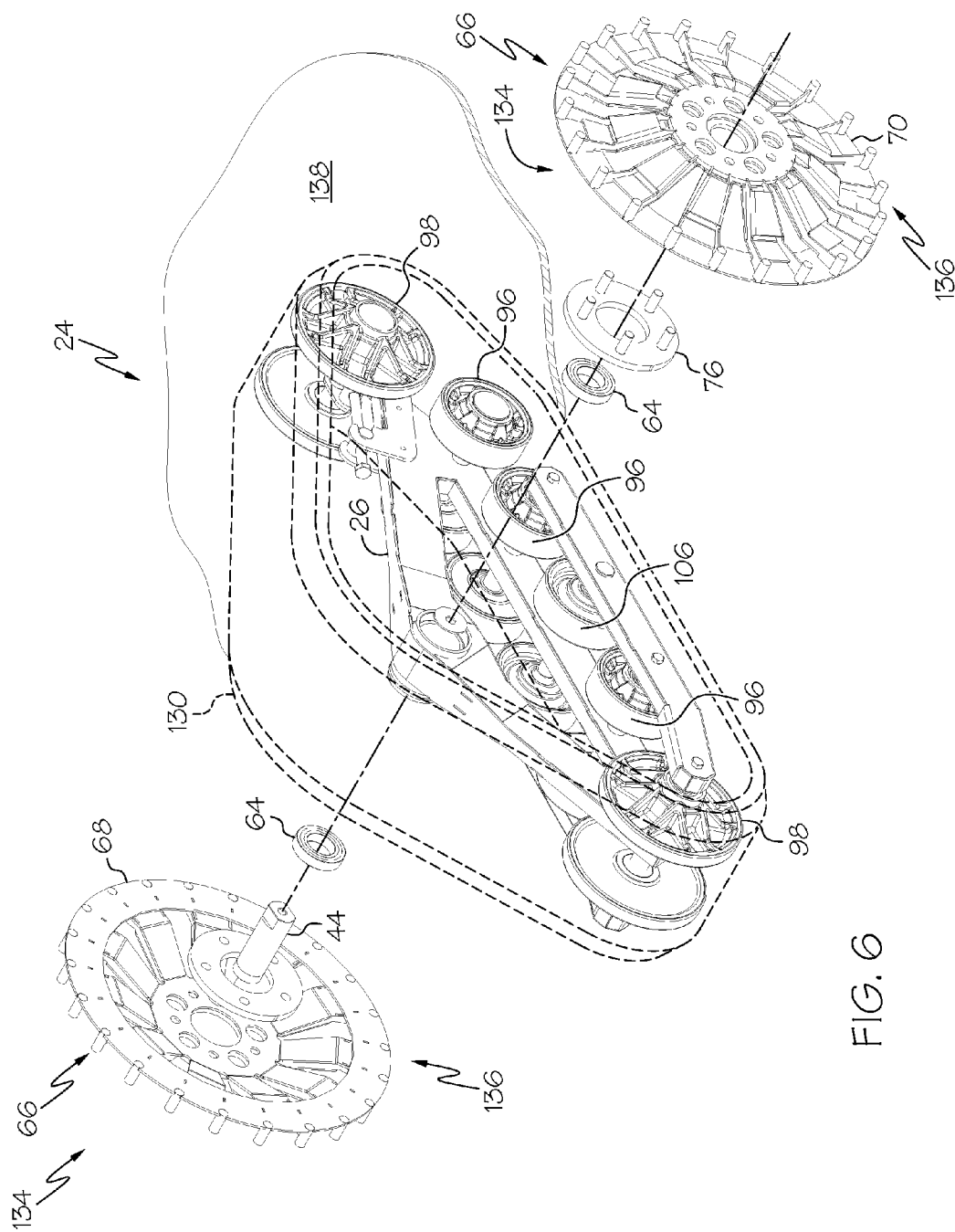
FIG. 6 is similar to FIG. 2 showing the addition of the endless track.

Turning to FIG. 6, the track drive 24 also includes an endless track 130. The endless track 130 is looped around the drive sprocket 66 and the idler wheels 96 and bogie wheels 98, 106. The drive sprocket 66 is movably engaged with the endless track 130 to transmit force to rotate the endless track 130 and propel the piece of outdoor power equipment 20. The drive sprocket 66 is engaged with the endless track 130 at a top portion 134 of the drive sprocket 66 and not engaged with the endless track 130 at a bottom portion 136 of the drive sprocket 66. In one example the half sprockets 68, 70 are located about one to two inches above the endless track 130 at the bottom portion 136 such that there is no contact between the half sprockets 68, 70 and the endless track 130 at that point. This can be readily seen in FIG. 8.

The size of the drive sprocket 66 and its orientation with respect to the endless track 130 can be calculated and/or selected to have an effective rolling radius about the same as a rolling radius of a tire/wheel combination that may be typically attached to the outdoor power equipment 20. The endless track 130 can be constructed of any suitable material including layers of polymer and/or rubber materials with reinforcing layers of cloth, cord, and/or wire, Kevlar, polyester, etc. While not shown, the ground engaging side of the endless track 130 can include various tread designs to assist in traction.

In this arrangement, a weight of the outdoor power equipment 20 is transferred through the associated drive hub 54, the drive axle 44, the support frame 26, and a combination of the bogie wheels 98, 106 and the idler wheels 96, the endless track 130, and into an associated driving surface 138. It is to be appreciated that the number and location of wheels 96, 98, 106 can be selected to limit the amount of weight supported by each wheel 96, 98, 106. In one example, the wheels 96, 98, 106 can be limited to supporting 100 pounds or less per each wheel 96, 98, 106. The wheels 96, 98, 106 transfer axial and radial loads through their respective axles to the support frame 26. Additionally, it is to be appreciated that the number of wheels 96, 98, 106 can also be selected and positioned to help ensure a relatively even distribution of weight on the endless track 130 from the front side 38 to the rear side 40.

Figure 7:
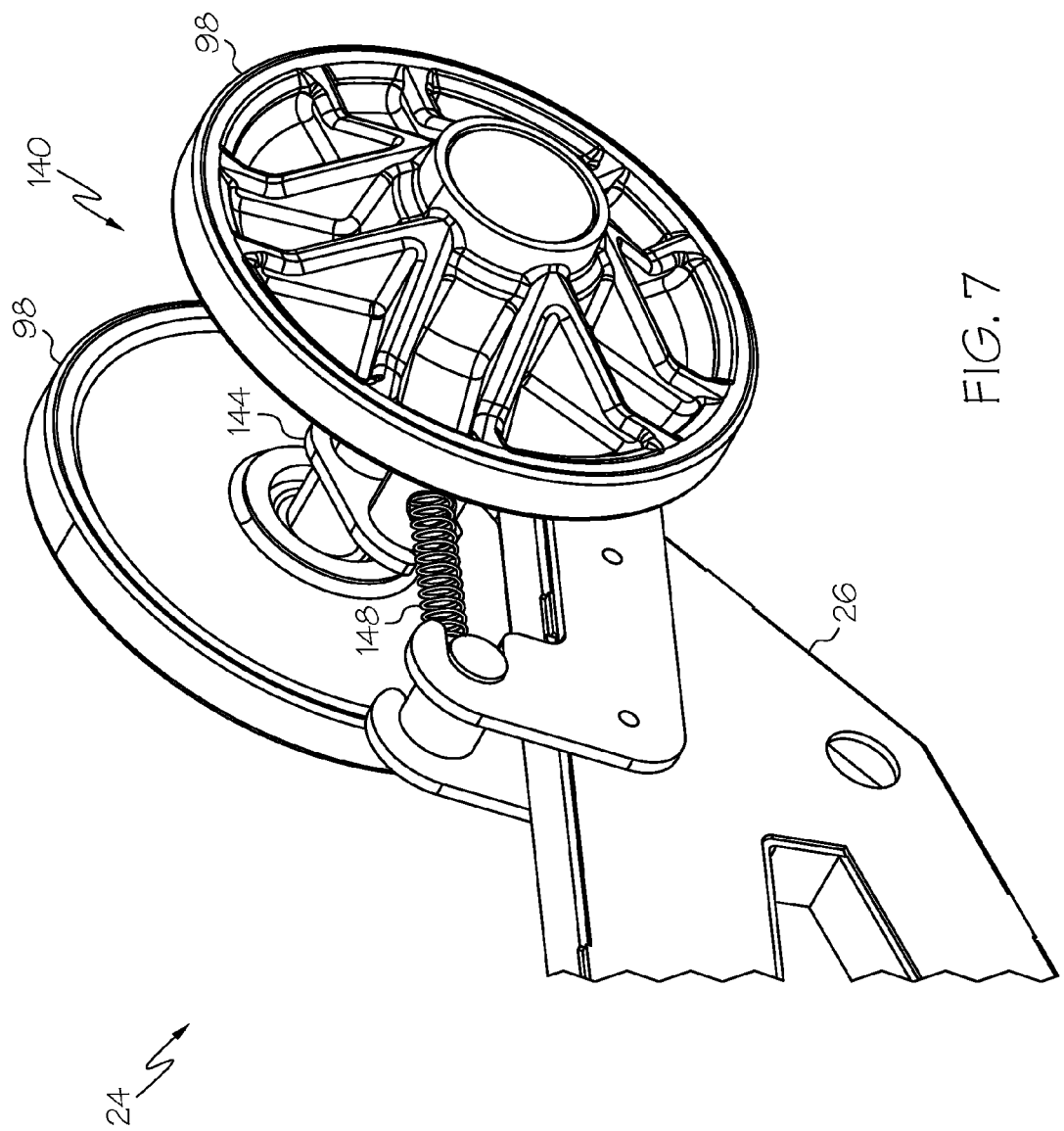
FIG. 7 is a perspective view of an example track tensioner using a spring.

Returning to FIG. 3A, the track drive 24 can also include a track tensioning mechanism 140 to maintain tension on the endless track 130. As shown, the pin 108 can be mounted on an arm 144 which is rotatably mounted to the support frame 26. As the frame is rotated in the direction of arrow 146, the distance between the pin and any other portion of the support frame 26 is altered, thereby moving the forward bogey wheel 98 generally inward and outward. The outward motion of the forward bogey wheel 98 increases and/or maintains an amount of tension on the endless track 130 by applying a force to the endless track 130 as the forward bogey wheel 98 is urged away from the support frame 26. In the shown example, the track tensioning mechanism 140 includes a threaded component 147 to maintain tension on the endless track 130. As the threaded component 147 is turned to move the threaded component 147 toward the arm 144, the arm 144 is forced to rotate away from the support frame 26, thereby placing a force on the forward bogey wheel 98 to add tension to the endless track 130. Other examples are also contemplated, such as using a spring device 148 as shown in FIG. 7. In one example, the track tensioning mechanism 140 can maintain the tension on the endless track 130 at a value of about 10% of the total vertical loading of the power outdoor equipment unit 20.

Figure 8:
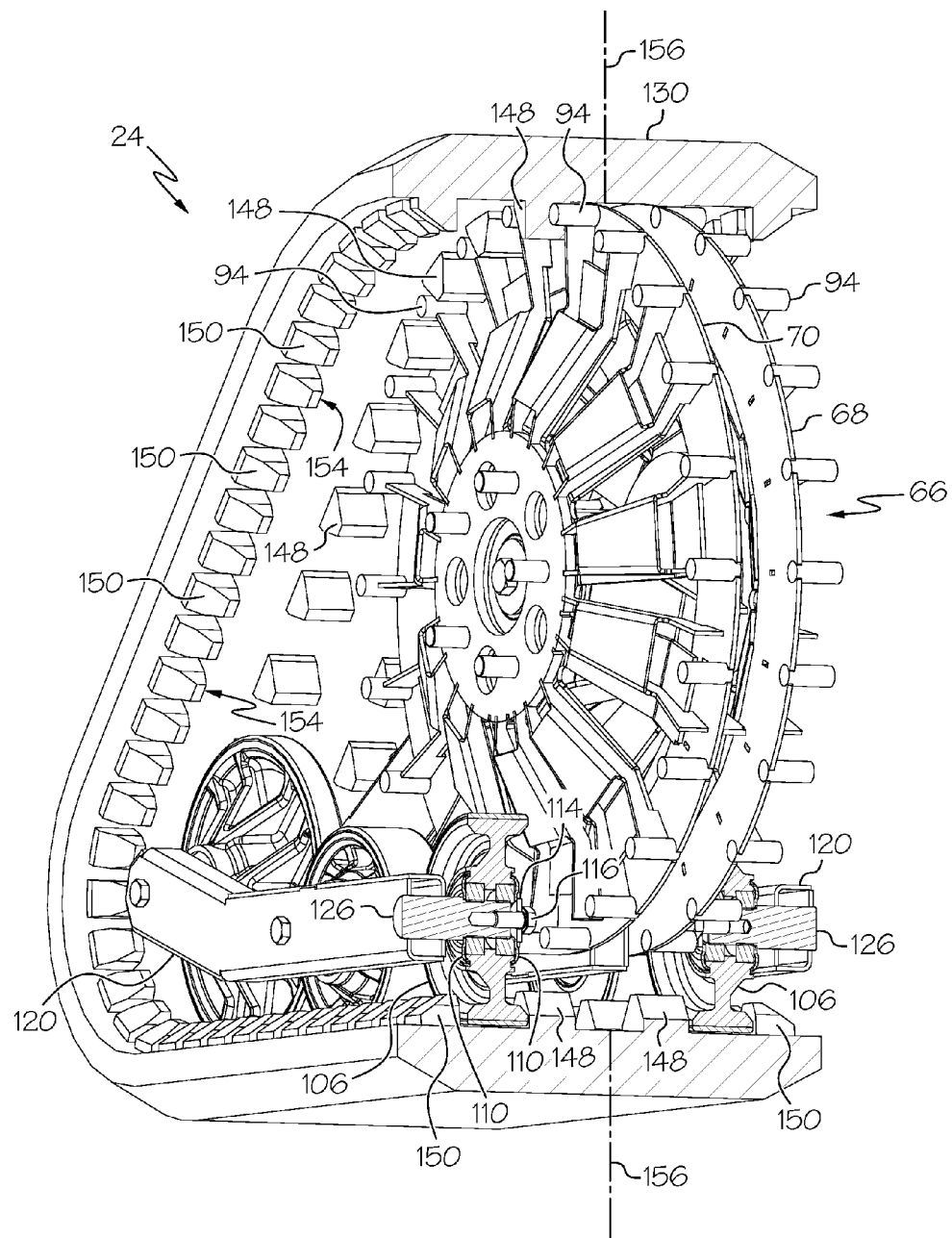
FIG. 8 is a perspective cut-away view of the track drive assembly of FIG. 2.

Turning to FIG. 8, the endless track 130 includes a plurality of drive lugs 148 which enable transfer of power between the drive sprocket 66 and the endless track 130. The drive lugs 148 are configured to interact with the drive teeth 94 of each half sprocket 68, 70. As shown in FIG. 6, the endless track 130 engages the drive sprocket 66 about an arc of contact. The configuration of the drive lugs 148 and the drive teeth 94 and the distance between each can be calculated and designed to improve the arc of contact by having multiple engagements between individual drive lug 148 pairs and drive tooth 94 pairs along the arc of contact. For example, the distance between drive lugs 148 can be slightly less than the spacing between the drive teeth 94 (i.e., an under-pitch condition). This difference in measurements can account for variations in the endless track 130 and the curvature of the endless track 130 at the contact points with the drive sprocket 66. This arrangement of multiple contacts can help distribute the loading of forces on the drive lugs 148 and the drive teeth 94 over multiple pairs at any single time.

Additionally, the drive teeth 94 are configured to engage the drive lugs 148 close to the drive lug pitch line in order to reduce bending moments and stress on the drive lugs 148. Furthermore, the drive teeth 94 are configured to reduce and/or eliminate the drive teeth 94 "scrubbing" the areas between the drive lugs 148 during traction drive load force reversals, such as those that can occur during outdoor power equipment 20 acceleration, deceleration, and turning maneuvers.

In some instances, alignment of the half sprockets 68, 70 can be advantageous, and marks may be provided on the half-sprockets 68, 70 in order to rotationally align the half-sprockets 68, 70. Alignment of the half-sprockets 68, 70 can be advantageous in order to force the drive teeth 94 from each of the half sprockets 68, 70 to contact respective drive lugs 148 at the same time.

Returning to FIG. 8, endless track 130 further includes a plurality of guide lugs 150 which help locate the endless track 130 with respect to the idler wheels 96 and the bogie wheels 98, 106. A side 154 of the guide lugs 150 can interact with the vertical sides of the wheels 96, 98, 106 to help keep the endless track 130 in a desired orientation as it rotates about the track drive structure. The drive lugs 148 are positioned closer to the center of the endless track 130 while the guide lugs 150 are positioned closer to the outer edges of the endless track 130. As shown, the idler wheels 96 and the bogie wheels 98, 106 are positioned to engage in rolling contact with the endless track 130 in an area between the drive lugs 148 and the guide lugs 150.

As can be seen in FIG. 8, the drive sprocket 66 is centrally positioned about a center line 156 of the endless track 130. Consequently, the support frame 26 is located substantially along the center line 156 of the endless track 130. The separation of the drive sprocket 66 into the interior half sprocket 68 and the exterior half sprocket 70 enables the sprockets 68, 70 to bracket the support frame 26.

The described structure can also be contained in a kit for adding or replacing a track drive 24 of outdoor power equipment 20. The kit can constitute two separate components: first, a track drive assembly 160 as shown in FIG. 2 (shown without the endless track 130) consisting of the support frame 26; the drive axle 44; the hub bearing 64 mounted on the drive axle 44 and the support frame 26; the drive sprocket 66 attached to the drive axle 44; the endless track 130; the plurality of idler wheels 96; the plurality of bogie wheels 98, 106; and the outer support link 120; and second, the plurality of hardware fasteners 92 (best seen in FIG. 3B). In this arrangement, the track drive 24 can be attached to the associated drive hub 54 by simply applying a fastener 92 or a plurality of fasteners 92 to stud(s) 86 in order to secure the single assembly 160 to the power outdoor equipment 20. As such, the track drive 24 can be attached to outdoor power equipment 20 without the need for disassembling any portion of the track drive 24. At the time of assembly (in the case of a new piece of outdoor power equipment 20) or when replacing a tire/wheel assembly (in the case of a replacement kit), the track drive 24 can be easily attached to the outdoor power equipment with only one tool.

In another example, the drive hub 54 and the drive axle 44 could be installed on the outdoor power equipment 20 as a first step. Then, the drive sprocket 66, the support link 120, the support frame 26, and the remainder of the track drive assembly 160 could be slid onto the drive axle 44 and secured with one fastener (e.g., screw 80 and washer 84 as shown in FIG. 3A) that is co-axial with the drive axle 44.

The described combination of components can provide many advantages. For example, the split drive sprocket can enable a centrally positioned support frame which can result in a lighter, stronger framework compared to some typical frames. Many previous frames extend over sprockets and wheels and bend back to support the sprockets, bogies, and idlers, for example, in an L-shape or a U-shape. The straight support frame described in this disclosure can reduce and/or eliminate significant bending moments on the support frame. The disc-shaped half sprockets can provide separation for hub bearing loading in the centrally positioned support frame. The split drive sprocket can also enable space to place structure centrally to the drive sprocket, including the support frame, bearings, etc.

Also, the effective rolling radius of the described structure can be the same or about the same as a pneumatic tire that it replaces. This can have multiple benefits including 1) lack of requirement to gear-up or gear-down the drive train to reproduce the same ground speed when replacing the tire, 2) eliminating the need to increase the height of the outdoor power equipment—this can maintain the same center of gravity of the outdoor power equipment and maintain handling characteristics, 3) maintaining the designed speed of the outdoor power equipment after replacing pneumatic tires with a track drive assembly. Some previous support frames required the use of a smaller drive sprocket due to interference with bogie wheels which, in turn, required a gear down for the drive train.

Other benefits of the described structure stem from the cantilevered support of the small bogie wheel from the outer support link. In this arrangement, the small bogie wheel can be placed astride the drive sprocket and relatively evenly distribute the weight of the power outdoor equipment over the length of the endless track which is in contact with a driven surface. In other words, there is no appreciable open space on the endless track from front to rear enabling relatively uneven weight distribution along the endless track. The outer support link enables proper support of the small bogie wheel despite the fact that the small bogie wheel is separated from the support frame by the spinning drive sprocket. Also, the small bogie wheel placed astride the drive sprocket helps prevent the endless track from bending upward to meet the drive sprocket. As previously described and as seen in FIG. 8, there is a distance between the drive sprocket and the endless track at the lower portion of the drive sprocket such that the two do not touch at that location during operation. In the event of the track device passing over a firm obstacle such as a large branch, the small bogie wheels will prevent the branch from deforming the endless track to meet the spinning drive sprocket and negatively affecting the operation of the track device.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A track drive for outdoor power equipment comprising:
a support frame;
a drive axle configured to attach to an associated drive hub on said outdoor power equipment;
a hub bearing mounted on said drive axle and said support frame, said hub bearing enables said drive axle to rotate relative to said support frame;
a drive sprocket attached to said drive axle, wherein said drive sprocket comprises an interior half sprocket and an exterior half sprocket, said half sprockets are located on either side of said support frame, wherein said drive sprocket comprises drive teeth spaced radially about said drive sprocket; and
an endless track,
wherein said drive sprocket is movably engaged with said endless track to transmit force to rotate said endless track and propel said outdoor power equipment,
wherein said support frame is located substantially along the center line of said endless track.

2. The track drive according to claim 1, wherein said support frame defines an aperture, said aperture being located substantially on a center line of said support frame with respect to a forward side and a rear side of said support frame, and said drive axle passes through said aperture.

3. The track drive according to claim 1, wherein said track drive is configured to be attached to the associated drive hub by simply applying a fastener to a single assembly.

4. The track drive according to claim 3, wherein said exterior half sprocket defines an oversize hole enabling a fastener to be applied to the associated drive hub to fasten the track drive to said outdoor power equipment.

5. The track drive according to claim 1, further comprising a track tensioning mechanism to maintain tension on said endless track.

6. The track drive according to claim 5, wherein said track tensioning mechanism comprises a threaded component to maintain tension on said endless track.

7. The track drive according to claim 5, wherein said track tensioning mechanism comprises a spring device to maintain tension on said endless track.

8. The track drive according to claim 1, further comprising:
a plurality of idler wheels;
a plurality of bogie wheels; and
an outer support link attached to said support frame, said outer support link is configured to support said idler wheels and said bogie wheels.

9. The track drive according to claim 8, wherein said endless track further comprises:
   a plurality of guide lugs which locate said endless track with respect to said idler wheels and said bogie wheels; and
   a plurality of drive lugs which enable transfer of power between said drive sprocket and said endless track.

10. The track drive according to claim 9, wherein said idler wheels and said bogie wheels are positioned between said drive lugs and said guide lugs.

11. The track drive according to claim 8, wherein a weight of said outdoor power equipment is transferred through said associated drive hub, said drive axle, said support frame, said bogie wheels and said idler wheels, said endless track, and into an associated driving surface, and said drive sprocket is engaged with said endless track at a top portion of said drive sprocket and not engaged with said endless track at a bottom portion of said drive sprocket.

12. The track drive according to claim 1, wherein said drive sprocket is disc-shaped.

13. The track drive according to claim 1, wherein said half sprockets are identical.

14. An outdoor power equipment unit comprising:
a track drive, said track drive comprising:
   a support frame;
   a drive axle configured to attach to an associated drive hub on said outdoor power equipment;
   a hub bearing mounted on said drive axle and said support frame, said hub bearing enables said drive axle to rotate relative to said support frame;
   a drive sprocket attached to said drive axle, wherein said drive sprocket comprises an interior half sprocket and an exterior half sprocket, said half sprockets are located on either side of said support frame, wherein said drive sprocket comprises drive teeth spaced radially about said drive sprocket; and
   an endless track,
wherein said drive sprocket is movably engaged with said endless track to transmit force to rotate said endless track and propel said outdoor power equipment,
wherein said support frame is located substantially along the center line of said endless track.

* * * * *